(12) United States Patent
Qu et al.

(10) Patent No.: US 8,403,496 B2
(45) Date of Patent: Mar. 26, 2013

(54) HIGH EFFICIENCY MICRO PROJECTION OPTICAL ENGINE

(75) Inventors: Lujie Qu, Shenzhen (CN); Guoxin Gao, Shenzhen (CN); Jing Lin, Shenzhen (CN); Jianhang He, Shenzhen (CN); Xin Wang, Shenzhen (CN)

(73) Assignee: Butterfly Technology (Shenzhen) Limited, Shenzhen (CN)

( * ) Notice: Subject to any disclaimer, the term of this patent is extended or adjusted under 35 U.S.C. 154(b) by 313 days.

(21) Appl. No.: 12/831,483

(22) Filed: Jul. 7, 2010

(65) Prior Publication Data
US 2011/0007240 A1 Jan. 13, 2011

(30) Foreign Application Priority Data
Jul. 7, 2009 (CN) .......................... 2009 1 0108523

(51) Int. Cl.
*G03B 21/36* (2006.01)

(52) U.S. Cl. ............... 353/39; 353/30; 353/31; 353/37; 353/38; 353/98; 349/5

(58) Field of Classification Search .................... 353/20, 353/30, 31, 37, 38, 39, 98, 99, 102, 122; 362/268, 84, 298, 299, 300; 349/5, 7, 8, 349/9
See application file for complete search history.

(56) References Cited

U.S. PATENT DOCUMENTS

| | | | |
|---|---|---|---|
| 6,238,063 B1 * | 5/2001 | Tanitsu et al. | 362/268 |
| 7,070,281 B2 * | 7/2006 | Kato | 353/20 |
| 7,258,450 B2 * | 8/2007 | Koyama et al. | 353/94 |
| 2004/0061839 A1 * | 4/2004 | Kim et al. | 353/94 |
| 2005/0057731 A1 * | 3/2005 | Lee et al. | 353/94 |
| 2005/0219847 A1 * | 10/2005 | Ikeda et al. | 362/268 |
| 2006/0132725 A1 * | 6/2006 | Terada et al. | 353/102 |
| 2006/0164607 A1 * | 7/2006 | Morejon et al. | 353/94 |
| 2006/0196944 A1 * | 9/2006 | Maeda et al. | 235/462.42 |
| 2007/0273835 A1 * | 11/2007 | Fan et al. | 353/7 |
| 2010/0060859 A1 * | 3/2010 | Krijn et al. | 353/31 |
| 2010/0118274 A1 * | 5/2010 | Choi et al. | 353/20 |

FOREIGN PATENT DOCUMENTS
CH 1609703 4/2005

* cited by examiner

*Primary Examiner* — Georgia Y Epps
*Assistant Examiner* — Sultan Chowdhury
(74) *Attorney, Agent, or Firm* — Hamre, Schumann, Mueller & Larson, P.C.

(57) ABSTRACT

A high efficiency micro projection optical engine includes a light source module, a lens assembly, a micro display panel and a projection lens. An image of the luminous surface of light emitting elements of the light source module is formed in the vicinity of the micro display panel. The micro display panel is arranged on the path of emission light of the lens assembly to modulate incident light and obtain image light with image information. The projection lens is used to project the image information on the micro display panel and form an image onto a screen. The optical engine enhances efficiency by means of critical illumination.

20 Claims, 5 Drawing Sheets

HIGH EFFICIENCY MICRO PROJECTION OPTICAL ENGINE

FIELD OF THE INVENTION

Present invention relates to technique of projection display, and particularly to a high efficiency micro projection optical engine.

DESCRIPTION OF THE RELATED ART

During recent years, technique of liquid crystal projection has been widely used in the field of the electronic teaching, office, business, advertisement, and amusement, etc. However, as the development of technology and increasing improvement of people's living standard, liquid crystal projection of small size, light weight and high quality image is becoming the objection people seeking for.

Chinese patent application publication numbered "CN1609703", entitled "lighting diode illumination device" disclosed a projection apparatus utilizing lighting diode illumination device, which includes a plurality of LED modules composed of a red LED module, a green LED module and a blue LED module, a plurality of liquid crystal on silicon light valve panels, a plurality of polarizing beam splitters, a light combination prism and a lens module. Wherein the liquid crystal on silicon light valve panels that corresponds to the LED modules are used to modulate the light beams generated by the plurality of LED modules. The plurality of polarizing beam splitters corresponds to the liquid crystal on silicon light valve panels and are used to separate the light beams generated by corresponding LED modules and irradiating to corresponding liquid crystal on silicon light valve panel and the reflection light beams after being modulated by corresponding liquid crystal on silicon light valve panel. The light combination prism is surrounded by the plurality of polarizing beam splitters, which is used to combine the reflection light beams after being modulated by the liquid crystal on silicon light valve panels. The lens module is positioned on the path of light outputted from the light combination prism image, and is used to receive the image outputted by the light combination prism, which eliminates the color difference and realizes action of imaging.

The principle of the projection apparatus will be described as follows: The LED modules emit red, green, and blue light beam simultaneously, which irradiate onto three liquid crystal on silicon light valve panels through corresponding polarizing beam splitter and to be modulated by them, thereafter, light combination prism combines the three basic color imaging light beams modulated by the three liquid crystal on silicon light valve panels into colorized image which passes through the lens module to eliminate the color difference and form an image, and at last is projected onto a projection screen. Projection apparatus having such configuration requires all the LED modules to emit light at the same time, in the mean time, three panels are required and three polarizing beam splitters are needed to be combined, so projection apparatus has low efficiency, complex configuration, long light path, big size, and has the disadvantages that too many optical devices are used, which can't satisfy the market's requirement of minimization and light weight.

SUMMARY OF THE INVENTION

For this reason, it is necessary to provide a high efficiency micro projection optical engine with compact and simple configuration, whose light path is shorter and size is smaller, to satisfy the market's requirement of minimization and light weight.

A high efficiency micro projection optical engine, comprising: a light source module, a lens assembly, a micro display panel and a projection lens, wherein the light source module comprises light emitting elements and shaping lens module which is used to collect and shape the received light beams. The lens assembly is arranged on the light path of the emission light of the shaping lens module. The shaping lens module and lens assembly forms an image of the luminous surface of the light emitting elements in the vicinity of the micro display panel. The micro display panel which is arranged on the light path of emission light of the lens assembly modulates incident light to obtain image light with image information. The projection lens is used to project the image of the image information on the micro display panel and form an image on a screen.

In the micro projection optical engine of present invention, the shaping lens module and lens assembly forms an image of the luminous surface of the light emitting element in the vicinity of the micro display panel, thus critical illumination is achieved, and square imaging light spot is obtained, thereby the efficiency of optical engine is effectively enhanced. Moreover, light emitted from the light emitting element illuminates the micro display panel through the illumination device composed of shaping lens module and lens assembly, and incident light is modulated by the micro display panel, and then, the image information on the micro display panel is projected onto the screen by the projection lens and an image is formed. The design process of the optical system merely relates to illumination device, micro display panel and projection lens, not to other optical device, so optical elements the configuration used are few, and the optical system has the feature of simple and compact structure, high light utilization ratio, short light path, small size and low cost, which can satisfy the market's requirement of minimization and light weight.

BRIEF DESCRIPTION OF THE DRAWINGS

In order to be easily understood, present invention will be described in detail by means of the following preferred embodiments and drawings.

DESCRIPTION OF THE PREFERRED EMBODIMENTS

Next, present invention will be further explained by the combination of the drawings and embodiments.

Figure 1:
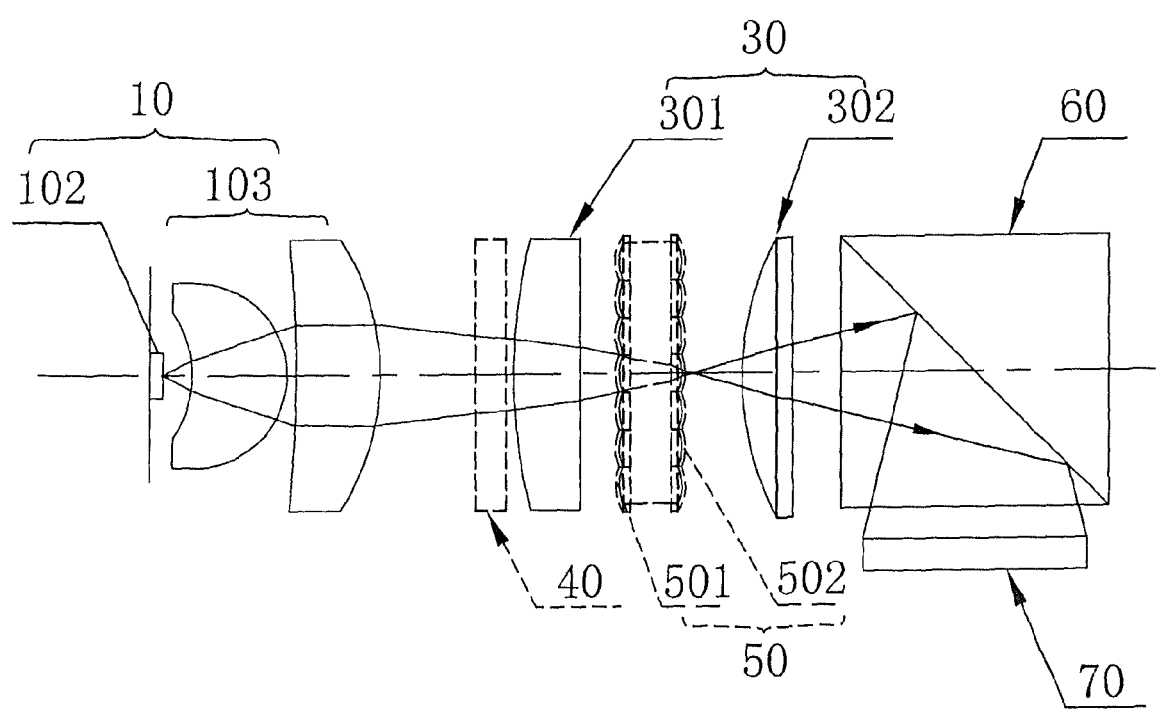
FIG. 1 is the plane structure schematic diagram of the high efficiency micro projection optical engine according to the first embodiment of present invention.

FIG. 1 is the plane structure schematic diagram of the high efficiency micro projection optical engine according to the first embodiment of present invention, which includes a light source module 10, a lens assembly 30, a polarization conversion system 40, a fly-eye lens module 50, a polarizing beam splitter 60, a micro display panel 70 and a projection lens (not shown), among which the light source module 10, the lens assembly 30, the polarization conversion system 40 and the fly-eye lens module 50 forms an illumination device.

The light source module 10 includes a light emitting element 102 and a shaping lens module 103 used to collect and shape the received light beams. In the embodiment of present invention, the light emitting element 102 is light emitting diode (LED) chip, and is used to emit light of 180 degree. Further more, a controller is connected to the LED chip and is utilized to control the time sequence of the light emitted form the chip. Work frequency of the chip is set according to the light illumination parameters needed by liquid crystal panel, to achieve the best color vision. In addition, the LED chips can be only one chip, and also can be multiple chips arranged in array. Multiple LED chips arranged in array is helpful to enhance the luminous flux of the whole illumination device, thereby the luminance of the projection light beam is intensified. Moreover, the shaping lens module 103 includes two plus lens arranged in sequence. In the embodiment of present invention, they are two meniscus plus lenses, which are made up of glass and arrayed between the light emitting element 102 and the lens assembly 30.

In other embodiments of present invention, shaping lens module may also be formed by plane convex lens or biconvex lens, the number of plus lens can either be one or more than two, which is not explained in detail any more.

The lens assembly 30 is arranged on the emission light path of the shaping lens module 103, which includes a first lens assembly 301 and a second lens assembly 302 arrayed in sequence. The first lens assembly 301 includes a plus lens which compresses the received light to reduce its divergence angle and enhance light efficiency, and refracts the light beams originally projected to the outside of the screen onto the screen, thereby the non-uniform phenomenon that the center part of the projection image is brighter and the edge part is darker is avoided. At the same time, the first lens assembly 301 together with the shaping lens module 103 and the second lens assembly 301 form an image of the luminous surface of the light source (i.e. light emitting element 102) in the finite position, i.e. in the vicinity of the micro display panel 70, which makes imaging light spot square and overcomes the preconception that the image of light source only can be formed in a infinite place (light spot obtained is circular) in the prior optical engine. Therefore, efficiency of the optical engine of present invention is far higher than the prior optical engine. In addition, the first lens assembly 301 is spherical lens or aspheric lens, which is to say, plus lens can be spherical lens, and also can be aspheric lens. Configuration of aspheric lens helpful to reduce image difference, and enhance the consistency of the emission light.

In other embodiment of present invention, the first lens assembly 301 also can include two or more lens, and the first lens assembly 301 is one of the spherical lens and aspheric lens or their combination. Moreover, the lens in the first lens assembly 301 is not limited to the plus lens used in the embodiment, but also can be minus lens or glued lens, depending on the requirement of design of the micro projection optical engine. That is to say, the first lens assembly 301 is combination of plus lens and glued lens or combination of minus lens and glued lens or combination of plus lens and minus lens, or combination of plus lens, minus lens and glued lens etc.

The polarization conversion system 40 is arranged between the light source module 10 and lens assembly 30, and is used to convert the received natural light into linear polarization light with single polarization, i.e. the polarization conversion system 40 can totally convert the incident light into light with s-polarization or p-polarization to enhance the light efficiency. Therefore, after light of 180 degree emitted from the LED chip being shaped by the shaping lens module, linear polarization light with single polarization is emitted. In the embodiment of present invention, the number of the polarization conversion system 40 is one, which can be a polarizing sheet, and also can be composed of several prisms combined together in series. For example, it is composed of a plurality of right triangle prisms and parallelogram prisms, and light-shield sector is provided on the incident surface of some of the prisms. Polarization beam splitting film or reflection film are plated on the faying surfaces of the prisms. The polarization beam splitting film and reflection film are alternately arranged. Emission surface of the other prisms is provided with half-wave plate. Of course, the polarization conversion system 40 also can be formed by the combining several parallelogram prisms and isosceles triangle prisms together in series, in which the parallelogram prisms are arranged symmetrically around one of the isosceles triangle prisms. Polarization beam splitting film is plated on the faying surface combined with the isosceles triangle prisms. Other faying surfaces are provided with polarization beam splitting film or reflection film which is arranged alternatively. At the same time, light emission surface of some of the prisms is provided with half-wave plate. Moreover, through changing the position of the half-wave plate, all the incident light can be converted into required linear polarization light.

In other embodiments of present invention, the polarization conversion system 40 may also be arranged on path of the emission light from the lens assembly 30. For example, the polarization conversion system 40 is arranged between the first lens assembly 30 and the fly-eye lens module 50; therefore, after the light of 180 degree emitted from the LED chips passing through the shaping lens module 103 and the first lens assembly 301, light with single polarization and small divergence angle is emitted. Of course, the polarization conversion system 40 also can be omitted.

The fly-eye lens module 50, which is arranged between the first lens assembly 301 and the second lens assembly 302, homogenizes the received light and includes a first micro lens array 501 and a second micro lens array 502 arranged in parallel along the light path. Each micro lens array is the combination of a plurality of the same or different micro lenses arrayed. The first micro lens array 501 is used to separate the light beam into multiple sub-light beams which are focalized on the second micro lens array 502. The second micro lens array 502 is used to form the image of the micro lens corresponding to the first micro lens array on the micro display panel 70, different sub-light beams overlap each other on the micro display panel 70, thus homogenized illumination is provided. Moreover, the first micro lens array 501 and the second micro lens array 502 can be integrated together by transparent body (e.g. plate glass), and also can be arranged separately.

In the embodiment of present invention, aspect ratio size of the micro lens is consistent with that of the micro display panel 70. For example, longitudinal size: transverse size is 3:4 or 9:16. Using micro lens having the same length breadth ratio with that of micro display panel 70 is favorable for obtaining illumination light spot with high energy utilization ratio and good homogeneity. Moreover, the micro lens is spherical lens or aspheric lens. The micro lens is rectangular micro lens.

In other embodiments of present invention, micro lens of the fly-eye lens module may also be circular micro lens. Curvature radius of the micro lens of the first micro lens array and that of the second micro lens array can be the same and may also be different. Of course, the fly-eye lens module may also be only composed of an array of micro lens formed by agglutinating a plurality of uniform or different micro lenses. The fly-eye lens module may also be omitted if the requirement of homogeneity of projection optical engine is not rigorous.

The second lens assembly 302 is integral lens, which is arranged on the path of emission light of the fly-eye lens module 50 and is utilized to form an image of the image of fly-eye lens module 50 onto the micro display panel 70. In the embodiment of present invention, the number of is the lens of the second lens assembly 302 is one.

In other embodiments of present invention, the second lens assembly 302 may also include a plurality of lenses arranged in sequence, some of which are arranged between polarizing beam splitter 60 and micro display panel 70. In general, lens between the polarizing beam splitter 60 and the micro display panel 70 is plane convex lens and also called field lens because it is in the vicinity of micro display panel 70.

The polarizing beam splitter 60 is arranged on the emission light path of illumination device, i.e. the path of incident light of the micro display panel 70. In the embodiment of present invention, the polarizing beam splitter 60 is prism polarizing beam splitter which is a cube formed by agglutinating two triangle prisms, and the middle faying surface is plated with polarization beam splitting film layer which forms polarization beam splitting surface. The polarization beam splitting surface can separate the light with p-polarization and light with s-polarization of the incident light. Of course, the polarizing beam splitter 60 may also be other shape agglutinated by other prisms, as long to as it can separate the light with p-polarization and light with s-polarization of the incident light.

Figure 3:
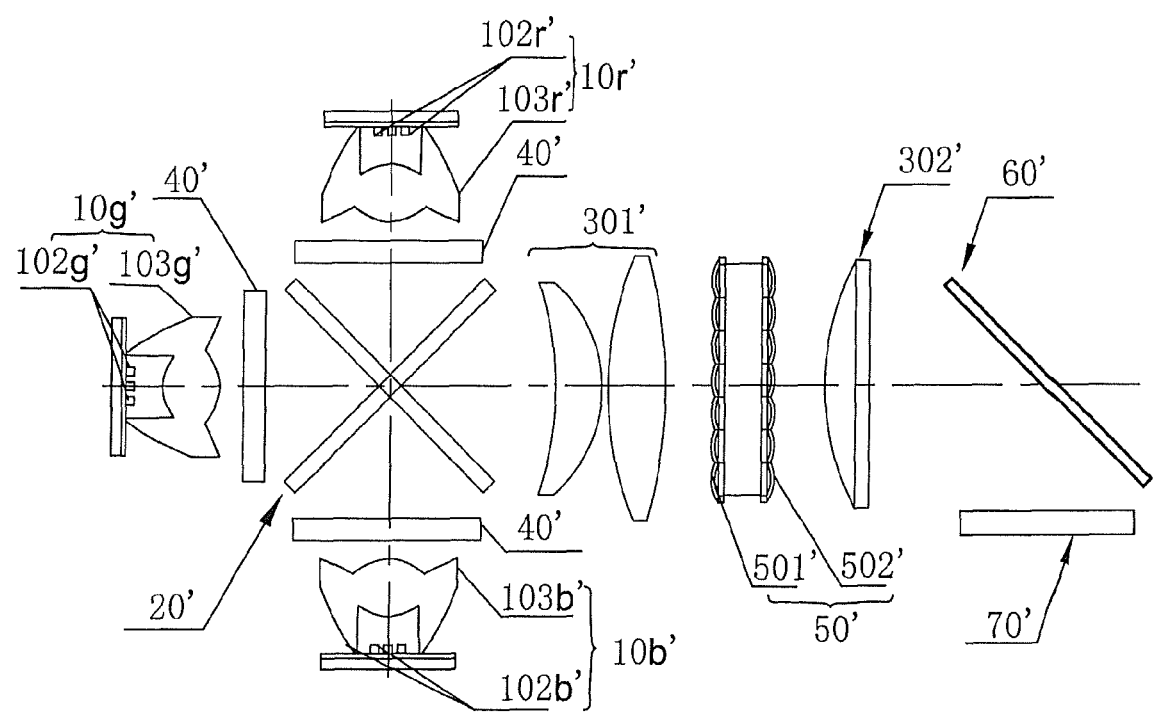
FIG. 3 is the plane structure schematic diagram of the high efficiency micro projection optical engine according to the third embodiment of present invention.

In other embodiment of present invention, the polarizing beam splitter 60 may also be replaced with a tabulate polarizing beam splitter (referring to FIG. 3).

The micro display panel 70 is arranged on the path of the emission light of the second lens assembly 302, and specifically is arranged on one side of the polarizing beam splitter 60, to modulate the incident light and obtain image light with image information. That is to say, the micro display panel 70 is used to modulate the received linear polarization light and convert it into another linear polarization light that is vertical to the received linear polarization light and is carried with image information. In the embodiment, the micro display panel 70 is reflection Liquid Crystal on Silicon (LCOS). When the polarization conversion system 40 is used in the optical engine, the micro display panel 70 is single chip micro display panel. If the received linear polarization light is the light with s-polarization, after modulated by the micro display panel 70, light with p-polarization carried with image information is reflected and transmitted onto the projection lens by the polarizing beam splitter 60. In other word, the projection lens and the micro display panel 70 are arranged relatively in parallel, and are used to project the image of image information on the micro display panel 70 onto the screen.

In other embodiment of present invention, the linear polarization light received by the micro display panel 70 may also be light with p-polarization, after modulated by the micro display panel 70, light with s-polarization carried with image information is reflected and transmitted onto the projection lens by the polarizing beam splitter 60. In other word, projection lens is arranged adjacent to the micro display panel 70. At this time, projection lens projects the light with s-polarization of the micro display panel 70 carried with image information to form an image.

Therefore, in the micro projection optical engine of present invention, the shaping lens module, the first lens assembly and the second lens assembly form an image of the luminous surface of the light emitting element in the vicinity of the micro display panel, critical illumination is achieved and square imaging light spot is obtained, thus efficiency of the optical engine is effectively enhanced. In the meantime, light illuminates the micro display panel evenly through the fly-eye lens module. Secondly, loss of light energy is reduced and light energy utilization ratio is enhanced by the arrangement of the polarization conversion system. In addition, the light emitted from the illumination device illuminates the micro display panel that modulate the incident light, thereafter, image information on the micro display panel is projected onto the external screen by projection lens. The design process of the optical system only relates to illumination device, micro display panel and projection lens, but not to other optical device. Thus the number of optical elements used is few, and the configuration is simple and compact. The optical system has good homogeneity, high light energy utilization ratio and low cost, whose light path is short and size is small, satisfying the market's requirement of minimization and light weight.

Figure 2:
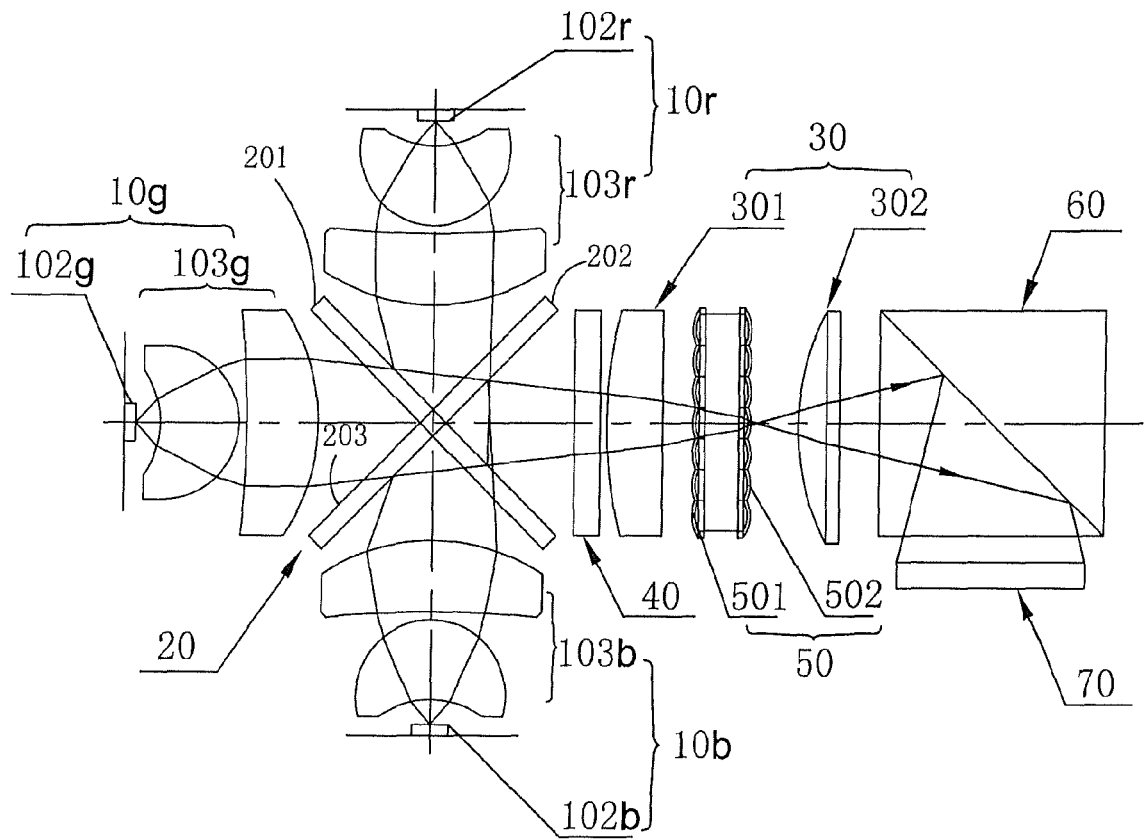
FIG. 2 is the plane structure schematic diagram of the high efficiency micro projection optical engine according to the second embodiment of present invention.

FIG. 2 is the plane structure schematic diagram of the high efficiency micro projection optical engine according to the second embodiment of present invention, which is basically similar to the optical engine of the first embodiment. The difference is that the light source module 10 in the illumination device shown in FIG. 2 is three color light source module, which includes a red light source module 10r, a blue light source module 10b, a green light source module 10g and a cross color combination lens 20.

The red light source module 10r includes a red light emitting element 102r and a first shaping lens module 103r used to collect and shape the received red light beams. The blue light source module 10b includes a blue light emitting element 102b and a second shaping lens module 103b used to collect and shape the received blue light beam. The green light source module 10g includes a green light emitting element 102g and a third shaping lens module 103g used to collect and shape the received green light beam. In the embodiment of present invention, the red light to emitting element 102r, the blue light emitting element 102b and the green light emitting element 102g are all Light Emitting Diode (LED) chip which is used to emit light of 180 degree. The first shaping lens module 103r, the second shaping lens module 103b and the third shaping lens module 103g also include two plus lenses arranged in sequence, which is arrayed in sequence among the light emitting element 102r, 102b, 103g and the cross color combination lens 20.

The cross color combination lens 20 is arranged at the convergence position of the path of emission light of the red light source module 10r, the blue light source module 10b and the green light source module 10g, which is used to combine the red light beam, blue light beam and green light beam into a bunch of light beam. In the embodiment of present invention, the cross color combination lens 20 is tabulate cross color combination lens and includes a first slab 201, a second slab 202 and a third slab 203 that are all forked. Furthermore, the first slab 201, the second slab 202 and the third slab 203 are all plated with films (not shown in the figure). The red light source module 10r, the blue light source module 10b and the green light source module 10g are arranged respectively on the three nonadjacent surfaces of the cross color combination lens 20 and lens assembly 30. Specifically, the first shaping lens module 103r that is used to collect red light beams and converge them into the size suitable for the cross color combination lens 20 is arranged between the red light emitting element 102r and the cross color combination lens 20. The second shaping lens module 103b that is used to collect blue light beams and converge the blue light beams into the size suitable for the cross color combination lens 20 is arranged between the blue light emitting element 102b and the cross color combination lens 20. The third shaping lens module 103g that is used to collect green light beams and converge the green light beams into the size suitable for the cross color combination lens 20 is arranged between the green light emitting element 102g and the cross color combination lens 20. Therefore, the number of plus lens of the first shaping lens module 103r, the second shaping lens module 103b and the third shaping lens module 103g can be designed according to the size of the cross color combination lens 20.

In other embodiments of present invention, the cross color combination lens 20 also can be forked shape formed by the combination of four slabs, it also of course can be replaced by X-cube which is surrounded by the red light source module 10r, the blue light source module 10b and the green light source module 10g, which will not be described in detail any more.

The first lens assembly 301 together with the first shaping lens module 103r, the second shaping lens module 103b, the third shaping lens module 103g and the second lens assembly 302 respectively form an image of the luminous surfaces of the red light emitting element 102r, the blue light emitting element 102b and the green light emitting element 102g in the vicinity of the micro display panel 70.

The polarization conversion system 40 is arranged between the cross color combination lens 20 and the lens assembly 30 and is used to is convert the received natural light into linear polarization light with single polarization. After light of 180 degree emitted from the LED chips being shaped by each shaping lens module and being subjected to the color combination process of the cross color combination lens 20, linear polarization light with single polarization is emitted.

In other embodiments of present invention, the polarization conversion system 40 also can be arranged on the path of emission light of the lens assembly, or may also include three or more polarization converters which are arranged among the red light source module 10r, the blue light source module 10b, the green light source module 10g and the cross color combination lens 20 respectively (see FIG. 3). Of course, the polarization conversion system 40 may also be omitted.

FIG. 3 is the plane structure schematic diagram of the high efficiency micro projection optical engine according to the third embodiment, which is basically same with the optical engine of the second embodiment. The difference lies in that each of the red light emitting element 102r', the blue light emitting element 102b' and the green light emitting element 102g' in the illumination device shown in FIG. 3 includes three LED chips.

In other embodiments of present invention, the number of LED chips may be one, two or more than three, which is not described in detail any more.

Each of the first shaping lens module 103r', the second shaping lens module 103b' and the third shaping lens module 103g' includes reflection Compound Parabolic Concentrator (CPC), whose material is optical plastic, optical glass or metal with film-plated reflection surface and the shape of the external section of which is elliptical or circular. The light emission area of the center of CPC takes the shape of gibbous curved surface, the peripheral reflection area takes the shape of curved surface, and the center part light incident area takes the shape of concave curved surface. Thus, incident light with large angle emitted from the light emitting element takes place total internal reflection in the area of peripheral reflection area, and then is converted into basically parallel emission light beams, and incident light with small angle emitted from the light emitting element is refracted and converged through the center part.

In other embodiments of present invention, structure of the CPC is not limited to that of the embodiment of present invention, e.g. the center part light incident area also can take the shape of plane surface. In addition, the first shaping lens module 103r', the second shaping lens module 103b' and the third shaping lens module 103g' may also at least include one lens, i.e. at least one lens can be arranged between each of the CPC and the cross color combination lens 20', to shape the light beams further and reduce divergence angle of emission light.

The first lens assembly 301' that includes two lenses arrayed in sequence, together with the first shaping lens module 103r', the second shaping lens module 103b', the third shaping lens module 103g' and the second lens assembly 302' form an image of the luminous surfaces of the red light emitting element 102r', the blue light emitting element 102b' and the green light emitting element 102g' in the vicinity of the micro display panel 70'.

In the embodiment of present invention, three polarization converters 40' are arranged among the red light source module 10r', the blue light source module 10b', the green light source module 10g' and the cross color combination lens 20' respectively.

In other embodiment of present invention, the number of the polarization converters 40' which is arranged on the path of emission light of the lens assembly or between the cross color combination lens 20' and the lens assembly (see FIG. 2) may be one, and of course also may be more than three or the polarization converters 40' is omitted in the illumination device.

The polarizing beam splitter 60' in the embodiment of present invention is tabulate polarizing beam splitter that is a tabulate transparent entity (e.g. glass, plastic etc.) with polarizing beam splitting film layer on the surface, or is made from tabulate crystals which is subjected to technical process and polarization beam splitting effect is produced thereof. Polarizing beam splitter having such structure has the advantage of wide angle of light reception, small size and light weight etc. and is favorable for the minimization of the optical engine.

In other embodiment of present invention, the polarizing beam splitter 60' also may be prism polarizing beam splitter, which is not described in detail herein (see FIG. 1, FIG. 2).

Figure 4:
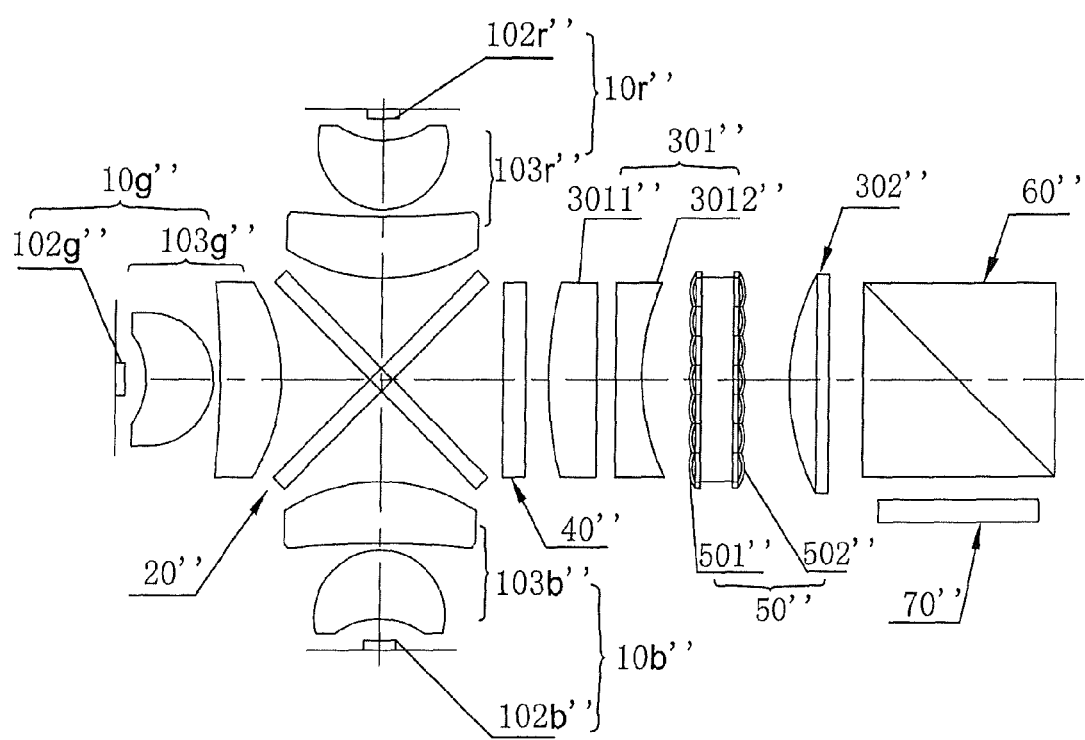
FIG. 4 is the plane structure schematic diagram of the high efficiency micro projection optical engine according to the fourth embodiment of present invention.
Figure 5:
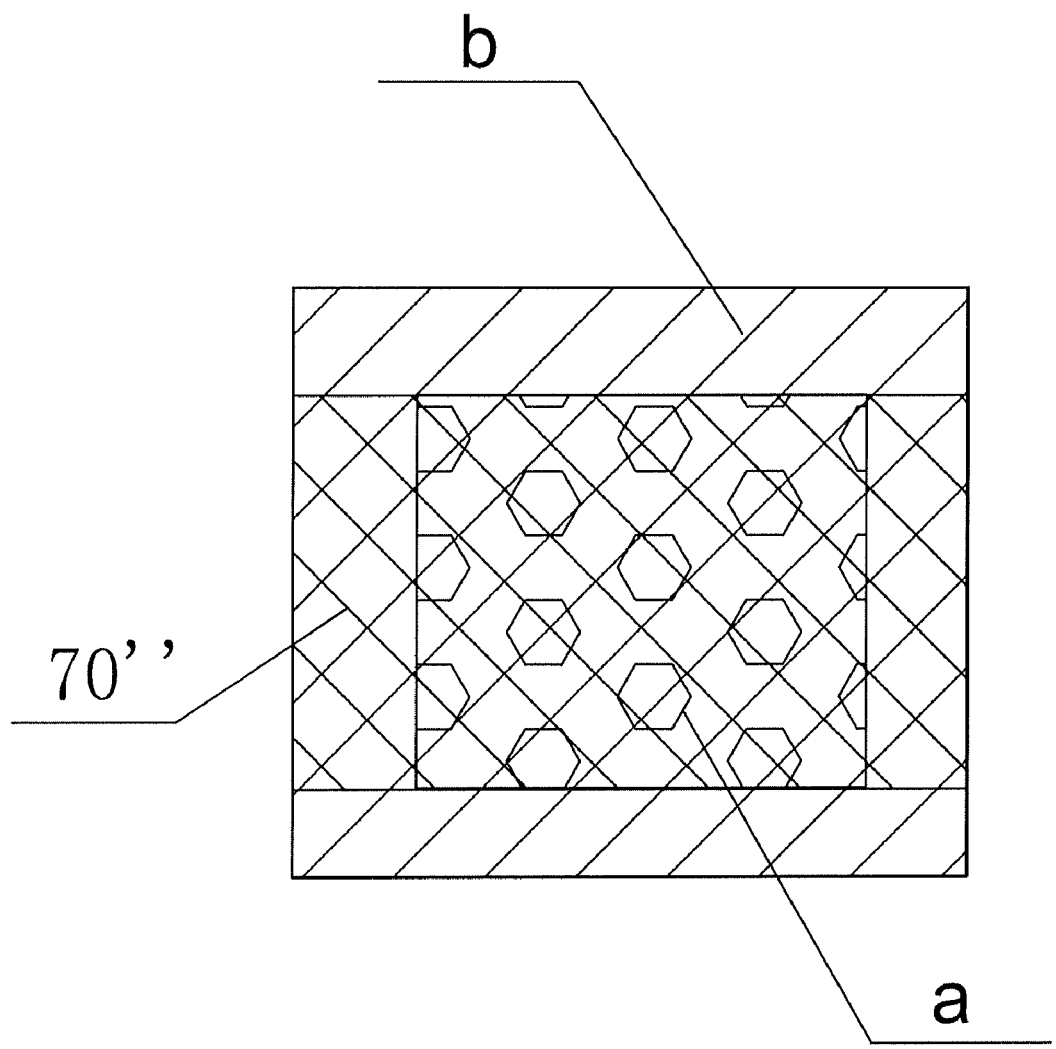
FIG. 5 shows the schematic diagram of the effect of light spot emitted from the illumination device shown in FIG. 4.

FIG. 4 is the plane structure schematic diagram of the high efficiency micro projection optical engine according to the fourth embodiment, and simultaneously referring to FIG. 5 that shows the schematic diagram of the effect of light spot emitted from the illumination device shown in FIG. 4. Structure of the optical engine is basically similar to that of the second embodiment. The difference lies in that the first lens assembly 301" in the illumination device shown in FIG. 4 includes two lenses 3011", 3012" arrayed in sequence. The lens 3011" is spherical lens or aspheric lens, and the lens 3012" is cylinder lens. Using structure of cylinder lens is favorable for the emitted light spot to cover with the whole panel in accordance with the length breadth ratio of the micro display panel 70".

Referring to FIG. 5, light emitting from the light source module transmits through the cross color combination lens 20" and light spot emitted by the spherical lens or aspheric lens is usually a small square a. And after passing through the cylinder lens 3012", the light spot is expanded into a big square b of which the side length is generally the same with the length of the micro display panel 70" whose length breadth ratio is usually 4:3 or 16:9. Consequently, the light spot emitted from the cylinder lens 3012" will cover with the whole micro display panel 70", realizing well matching with the micro display panel 70".

In other embodiments of the present invention, the cylinder lens may be arranged in front of the spherical lens or aspheric lens or in the back of them, the number of which may be two or more. Moreover, the spherical lens or aspheric lens may also be agglutinated with the cylinder lens to form glued lens. Of course, the first lens assembly 301" may be a single cylinder lens, and also may be the combination of the cylinder lens and the spherical lens or aspheric lens. In a word, it is suitable as long as the light spot emitted from the illumination device can cover with the whole panel in accordance with the length breadth ratio of the micro display panel.

Therefore, in the micro projection optical engine of present invention, light beams of different colors from each light source module are converged into one bunch of light beam by the cross color combination lens, light with small divergence angle is emitted through lens assembly, and image of the luminous surface of the light source is formed in the vicinity of the micro display panel, thus square imaging light spot is obtained, which enhance the efficiency of the optical engine effectively. In the mean time, by the fly-eye lens module thereof, light evenly illuminates the micro display panel. Secondly, the arrangement of polarization conversion system reduces the loss of light energy and enhances the utilization ratio of light energy. Furthermore, light emitted from the illumination device illuminates the micro display panel which modulate the incident light, thereafter, image information on the micro display panel is formed onto the external screen by the projection lens, thus the process of the design of the optical system only relates to illumination device, micro display panel and projection lens, but not to other optical device, so the optical elements used in the optical system is few and the optical system has simple configuration, compact structure, good homogeneity, and also has the advantage of high utilization ratio of light energy, short light path, small size and low cost, which satisfies the market's requirement of minimization and light weight.

The embodiments as stated above are preferred embodiments of present invention, but the practice scope of the present invention is not limited to this. The scope of the present invention is not limited to these embodiments. For example, the red light emitting element, the blue light emitting element and green light emitting element are a single or a plurality of laser chips arranged in array, and the first, second and third shaping lens module include expanded beam lens, which are used to expand the laser light beams emitted from the laser chips and shape them into suitable size needed by passing through the cross color combination lens. Moreover, the micro display panel is transmissive liquid crystal panel that is arranged on the path of emission light of the illumination device and modulates the incident light and transmits light with image information, at this time, the polarizing beam splitter is omitted. Any equivalent modifications that based on the shape and structure of present invention will fall within the scope of present invention.

What is claimed is:

1. A high efficiency micro projection optical engine, comprising:
   a light source module including light emitting elements and shaping lens module used to collect and shape the received light beams;
   a lens assembly arranged on the path of emission light of the shaping lens module;
   a micro display panel arranged on the path of emission light of the lens assembly that modulates the incident light, and obtains image light with image information; and
   a projection lens used to project the image information on the micro display panel and form an image onto a screen,
   wherein the lens assembly includes a cylinder lens configured to allow an emitted light spot to cover the whole area of the micro display panel in accordance with a length-breadth ratio of the micro display panel, and
   wherein the shaping lens module and the lens assembly form an image of the luminous surface of the light emitting elements in the vicinity of the micro display panel.

2. The high efficiency micro projection optical engine of claim 1, wherein said lens assembly includes a first lens assembly and a second lens assembly arrayed in sequence.

3. The high efficiency micro projection optical engine of claim 2, wherein said high efficiency micro projection optical engine also includes a fly-eye lens module arranged between the first lens assembly and the second lens assembly that homogenizes the received light.

4. The high efficiency micro projection optical engine of claim 3, wherein said fly-eye lens module is a combination of a plurality of the same or different micro lenses arrayed, and the aspect ratio size of said micro lens is consistent with that of the micro display panel.

5. The high efficiency micro projection optical engine of claim 4, wherein said micro lens is spherical lens or aspheric lens.

6. The high efficiency micro projection optical engine of claim 2, wherein said first lens assembly and second lens assembly include one lens or a plurality of lenses arrayed in sequence.

7. The high efficiency micro projection optical engine of claim 2, said first lens assembly is one of the spherical lens, aspheric lens and cylinder lens or the combination of them.

8. The high efficiency micro projection optical engine of claim 1, also includes a polarization conversion system which is used to convert the received natural light into linear polarization light with single polarization and is arranged between the light source module and the lens assembly or on the path of emission light of the lens assembly.

9. The high efficiency micro projection optical engine of claim 1, wherein said micro display panel is single chip micro display panel.

10. A high efficiency micro projection optical engine, comprising:
    a light source module including light emitting elements and shaping lens module used to collect and shape the received light beams;
    a lens assembly arranged on the path of emission light of the shaping lens module;
    a fly-eye lens module arranged on the path of emission light of the light source module;
    a micro display panel which is arranged on the path of emission light of the lens assembly to modulate the incident light and obtain image light with image information; and
    a projection lens used to project the image information on the micro display panel and form an image onto a screen,
    wherein the shaping lens module and the lens assembly form an image of the luminous surface of the light emitting elements in the vicinity of the micro display panel, wherein said light source module is three color light source module, including:
- a red light source module which emits red light beam includes red light emitting element and a first shaping lens module used to collect and shape the received red light beams;
- a blue light source module which emits blue light beam includes blue light emitting element and a second shaping lens module used to collect and shape the receive blue light beams;
- a green light source module which emits green light beam includes green light emitting element and a third shaping lens module used to collect and shape the receive green light beams; and
- a cross color combination lens which is used to combine the red light beam, the blue light beam and the green light beam into one beam of light is arranged at the convergence position of the path of emission light of the red light source module, the blue light source module and the green light source module,
- wherein the fly-eye lens module is located on the path of the combined light from the cross color combination lens.

11. The high efficiency micro projection optical engine of claim 10, also includes a polarization conversion system which is used to convert the received natural light into linear polarization light with single polarization is arranged on the path of emission light of the lens assembly or between the cross color combination lens and the lens assembly or is arranged respectively between the red light source module, the blue light source module, the green light source module and the cross color combination lens.

12. The high efficiency micro projection optical engine of claim 10, wherein said micro display panel is single chip micro display panel.

13. The high efficiency micro projection optical engine of claim 10, wherein the red light emitting element, blue light emitting element and green light emitting element are single LED chip or a plurality of LED chips arranged in array.

14. The high efficiency micro projection optical engine of claim 13, wherein each of the first shaping lens module, the second shaping lens module and the third shaping lens module includes reflection compound parabolic concentrator or at least one lens arrayed in sequence or their combination.

15. The high efficiency micro projection optical engine of claim 10, wherein the red light emitting element, the blue light emitting element and the green light emitting element is a single laser chip or a plurality of laser chips arranged in array.

16. The high efficiency micro projection optical engine of claim 15, wherein each of the first shaping lens module, the second shaping lens module and the third shaping lens module includes expanded beam lens which is used to expand the laser light beams emitted from the laser chip and shape them into suitable size needed by passing through the cross color combination lens.

17. The high efficiency micro projection optical engine of claim 10, wherein said cross color combination lens is tabulate cross color combination lens or prism cross color combination lens.

18. The high efficiency micro projection optical engine of claim 1, wherein said micro display panel is reflection Liquid Crystal on Silicon whose incident light path is provided with a polarizing beam splitter.

19. The high efficiency micro projection optical engine of claim 18, wherein said polarizing beam splitter is tabulate polarizing beam splitter or prism polarizing beam splitter.

20. The high efficiency micro projection optical engine of claim 1, wherein said micro display panel is transmissive liquid crystal panel.

* * * * *